(12) United States Patent
Matsumoto et al.

(10) Patent No.: US 10,978,762 B2
(45) Date of Patent: Apr. 13, 2021

(54) BATTERY PACK

(71) Applicant: HONDA MOTOR CO., LTD., Tokyo (JP)

(72) Inventors: Takashi Matsumoto, Wako (JP); Noriaki Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/648,897

(22) PCT Filed: Sep. 29, 2017

(86) PCT No.: PCT/JP2017/035367
§ 371 (c)(1),
(2) Date: Mar. 19, 2020

(87) PCT Pub. No.: WO2019/064467
PCT Pub. Date: Apr. 4, 2019

(65) Prior Publication Data
US 2020/0227696 A1    Jul. 16, 2020

(51) Int. Cl.
*H01M 2/10* (2006.01)
*H01M 50/213* (2021.01)
*H01M 50/20* (2021.01)

(52) U.S. Cl.
CPC ......... *H01M 50/213* (2021.01); *H01M 50/20* (2021.01); *H01M 2220/20* (2013.01)

(58) Field of Classification Search
CPC .............. H01M 50/213; H01M 50/20; H01M 2220/20; H01M 2/1077; Y02E 60/10
See application file for complete search history.

(56) References Cited

U.S. PATENT DOCUMENTS

| | | | |
|---|---|---|---|
| 2015/0214518 A1 | 7/2015 | Kano | |
| 2015/0222131 A1 | 8/2015 | Kano | |
| 2017/0033421 A1* | 2/2017 | Curfew | .................. H01M 2/202 |
| 2017/0263901 A1 | 9/2017 | Kishii et al. | |
| 2018/0138561 A1* | 5/2018 | Lee | .................. H01M 10/6556 |

FOREIGN PATENT DOCUMENTS

| | | |
|---|---|---|
| EP | 3121869 | 1/2017 |
| JP | 2002-141114 | 5/2002 |
| JP | 2013-196810 | 9/2013 |
| JP | 2014-235803 | 12/2014 |
| JP | 2016-115599 | 6/2016 |
| JP | 2017-076556 | 4/2017 |
| WO | 2016/013150 | 1/2016 |

OTHER PUBLICATIONS

International Search Report and Written Opinion for International Application No. PCT/JP2017/035367 dated Nov. 7, 2017, 8 pages.
Extended European Search Report for European Patent Application No. 17927465.9 dated Sep. 21, 2020.

* cited by examiner

*Primary Examiner* — Lisa S Park
(74) *Attorney, Agent, or Firm* — Amin, Turocy & Watson, LLP

(57) ABSTRACT

A battery pack provided with a battery core pack having a plurality of battery cells held by a holding part of a cell holder, and a case for accommodating the battery core pack. The cell holder has a peripheral wall part surrounding the holding part. A plurality of slits extending along the peripheral direction on an end surface of the peripheral wall part are provided to the peripheral wall part.

7 Claims, 6 Drawing Sheets

BATTERY PACK

TECHNICAL FIELD

The present invention relates to a battery pack that includes a battery core pack including a plurality of battery cells held in a cell holder.

BACKGROUND ART

Battery packs that have a battery core pack including a plurality of battery cells held in a cell holder, and a case accommodating the battery core pack, are known as battery packs that can be removably mounted in electric vehicles such as electric power-assisted bicycles, electric motorcycles, and the like, for example.

Battery packs of this type may undergo an impact load if, for example, they fall while being attached to or removed from an electric vehicle etc. In order to avoid a situation where the impact load reaches to the battery cells through the case and cell holder and the battery cells suffer a load exceeding its load capacity, Japanese Laid-Open Patent Publication No. 2014-049225, for example, proposes providing impact mitigating ribs on the cell holder. This cell holder has a holding portion for holding a plurality of battery cells. The outer peripheral surfaces of the holding portion face the peripheral walls of the cell holder at an interval. The impact mitigating ribs have a bent shape that connects the outer peripheral surface of the holding portion and the peripheral wall of the cell holder.

The impact mitigating ribs deform elastically in the direction in which the impact load is applied, to thereby mitigate the load transmitted to the battery cells.

SUMMARY OF INVENTION

Improving the impact absorbing capability of the impact mitigating ribs requires increasing the amount of deformation of the impact mitigating ribs within the elastic region by adjusting the bent shape of the impact mitigating ribs, increasing the volume thereof, and the like. However, there is a limit to the dimensions of the space that can be formed between the outer peripheral surface of the holding portion and the outer peripheral wall of the cell holder without increasing the size of the battery pack.

Accordingly, there is a limit also to the range in which the bent shape and volume of the impact mitigating ribs provided in that space can be adjusted. That is, it is difficult to improve the impact absorbing capability without making the battery pack larger.

A main object of the present invention is to provide a battery pack capable of improving its impact resistance without increase in size.

An aspect of the present invention provides a battery pack including a battery core pack having a plurality of battery cells held in a holding portion of a cell holder, and a case accommodating the battery core pack, wherein the cell holder includes a peripheral wall portion that surrounds the holding portion, and the peripheral wall portion has a plurality of slits formed therein, the slits extending in an end surface of the peripheral wall portion along a peripheral direction thereof.

According to this battery pack, when subjected to an impact load, the peripheral wall portion deforms elastically in the direction in which the width of the slits contracts, whereby the cell holder can absorb the impact load to reduce the load transmitted to the battery cells. Furthermore, even if an impact load is applied intensively to part of the peripheral wall portion, the plurality of slits can disperse and absorb the impact load within the peripheral wall portion.

That is, with the battery pack having the slits formed in the peripheral wall portion itself, it is possible to improve the impact resistance without making the battery pack larger, unlike in the case where, for example, the holding portion and the peripheral wall portion are separated from each other and impact mitigating ribs etc. are provided therebetween. It is also possible to easily improve the impact resistance of battery packs manufactured according to various specifications, by adjusting the extending length, width, depth, number, arrangement, etc. of the slits, according to the shape of the case, shape and weight of the battery core pack, arrangement of the battery core pack in the case, etc., for example. Furthermore, the impact resistance can be improved by the simple structure where the slits are only formed in the peripheral wall portion. Moreover, impact loads can be absorbed repeatedly as long as the peripheral wall portion deforms within the elastic limit.

In the battery pack above, preferably, the peripheral wall portion includes, formed at a corner thereof, a recessed portion that is recessed toward the holding portion. When a load is applied to the peripheral wall portion in the direction in which the slits extend, it is difficult for the peripheral wall portion to deform, as compared to cases where a load is applied from other directions. In order to deal with this, the recessed portion is formed in the corner and the slits are formed along the peripheral directions of the recessed portion. With this configuration, the direction in which a load is applied and the direction in which slits extend intersect each other, so that the peripheral wall portion can easily deform elastically in the direction in which the width of slits contracts, and thus it is possible to improve the impact absorbing capability of the peripheral wall portion. Preferably, the battery pack further includes a film configured to cover openings of the slits. In this case, it is possible to prevent entry of foreign matter or potting material, made of insulating resin etc., into the slits through the openings of the slits. That is, it is possible to prevent a situation where such foreign matter, potting material, etc. hinder the deformation of the peripheral wall portion, and this eliminates the possibility of decrease in the impact absorbing capability of the peripheral wall portion.

In the battery pack above, preferably, the slits are arranged to form a plurality of lines that are arranged side by side at an interval therebetween, between an outer peripheral edge and an inner peripheral edge of the end surface of the peripheral wall portion. This facilitates the elastic deformation of the peripheral wall portion subjected to an impact load, thereby improving the impact absorbing capability of the peripheral wall portion.

In the battery pack above, preferably, each of the lines includes the plurality of slits that are arranged along the peripheral direction, with interval portions interposed respectively therebetween. This further facilitates the elastic deformation of the peripheral wall portion subjected to an impact load and facilitates dispersion and absorption of the impact load within the peripheral wall portion. This further improves the impact absorbing capability of the peripheral wall portion.

In the battery pack above, preferably, the slits and the interval portions are arranged side by side in a direction in which the plurality of lines are arranged side by side. This avoids a situation in which the impact load is transmitted to the battery cells through the interval portions. That is, the direction in which the impact load is applied effectively intersects the direction in which the slits extend, and thus it is possible to favorably improve the impact absorbing capability of the entire peripheral wall portion.

In the battery pack above, preferably, each of the slits, as viewed in a depth direction thereof, has a shape that has circular portions formed at both ends thereof in a direction in which the slit extends and a linear portion formed between the circular portions, and each of the circular portions has a diameter that is larger than a line width of the linear portion. Providing the circular portions at both ends in the direction in which the slit extends suppresses concentration of stress at both ends of the slit when the peripheral wall portion deforms due to an impact load. As a result, it is possible to improve the durability of the cell holder and thus the durability of the battery pack.

DESCRIPTION OF EMBODIMENTS

The battery pack according to the present invention will be described in detail referring to the accompanying drawings in conjunction with preferred embodiments.

Figure 1:
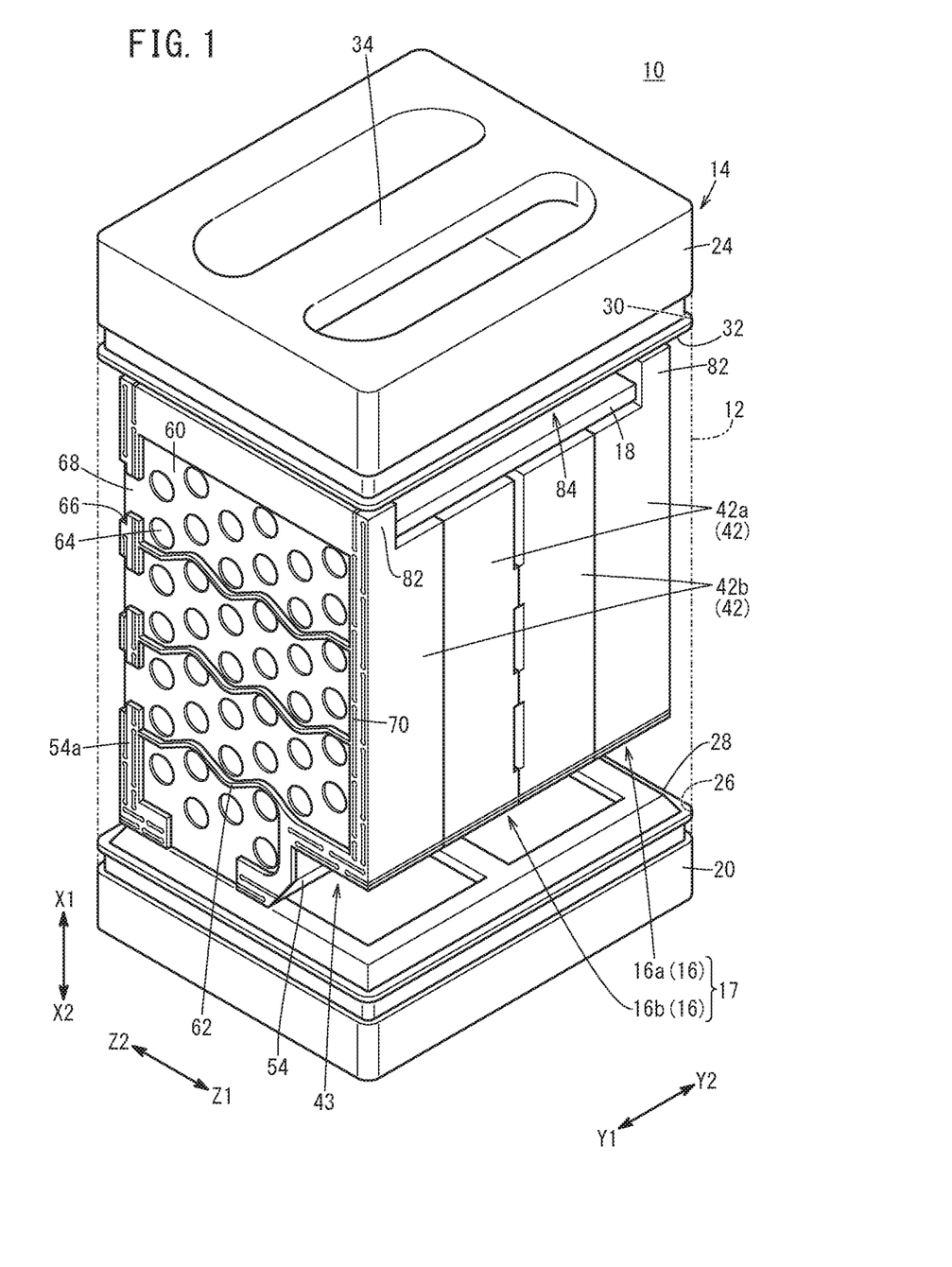
FIG. 1 is a schematic perspective view of a battery pack according to an embodiment of the present invention.

FIG. 1 is a schematic perspective view of a battery pack 10 according to this embodiment. In order to facilitate understanding, FIG. 1 shows an exterior case 12 with two-dot chain line so that the constituent components provided inside the exterior case 12 can be seen.

The battery pack 10 can be suitably applied as a portable battery pack 10 that is removably mounted in an electric vehicle (not shown) such as an electric power-assisted bicycle, electric motorcycle, etc. Accordingly, examples in which the battery pack 10 is mounted in an electric vehicle will be described below, but application thereof is not particularly limited thereto. The battery pack 10 can be applied to various devices that require electric power. Note that the top-bottom direction of the battery pack 10 will be defined as the vertical direction that is defined when the battery pack 10 is mounded in an electric vehicle (arrow X1, X2 direction in FIG. 1).

As shown in FIG. 1, basically, the battery pack 10 includes a case 14, a connected body 17 including two battery core packs 16a, 16b connected to each other, a battery management unit (BMU) 18, and a connector unit not shown. The case 14 can be made of metal such as aluminum, or resin (including fiber-reinforced resin), etc. The case 14 includes a bottom case 20 that covers the bottom surface of the connected body 17, the exterior case 12 that is mounted on the upper end of the bottom case 20 to cover the side surfaces of the connected body 17, and a top case 24 that is mounted on the upper end of the exterior case 12 to cover the upper surface of the connected body 17.

The bottom case 20 is a casing that has an opening formed at its upper end, which accommodates the connector unit and the like. The connector unit is exposed out of the case 14 through, for example, a cutout etc. formed in the bottom wall of the bottom case 20, so as to be connected to a power supply port of an electric vehicle, or to a charging device for charging the connected body 17. None of the cutout, the power supply port, and the charging device are not shown. The power supply port or charging device and the connected body 17 can be electrically connected via the BMU 18 through a lead wire etc. (not shown), by connecting the connector unit to the power supply port or charging device.

The exterior case 12 has openings formed at both its ends in the vertical direction. Part of the upper end of the bottom case 20 is inserted into the opening at the lower end of the exterior case 12. The exterior case 12 has a lower-side fixing groove 26 that is formed in inner walls thereof along its peripheral directions, at a position above the upper end of the bottom case 20 inserted in the exterior case 12. A lower-side battery core pack frame 28 is fixed in the lower-side fixing groove 26 and supports the connected body 17 from under. The bottom wall of the bottom case 20 has raised portions formed thereon, which project toward the lower-side battery core pack frame 28, and the raised portions and the lower-side battery core pack frame 28 are fixed by bolts etc. (none of which are shown).

Part of the lower end of the top case 24 is inserted in the opening at the upper end of the exterior case 12. An upper-side fixing groove 30 is formed in the inner walls of the exterior case 12 at a position below the lower end of the top case 24 inserted into the exterior case 12, and an upper-side battery core pack frame 32 is fixed in the upper-side fixing groove 30 and abuts on the upper end surface of the connected body 17. The connected body 17 is thus held between the upper-side battery core pack frame 32 and the lower-side battery core pack frame 28.

The top case 24 is a casing that has an opening formed at its lower end, and the top case 24 further has a handle portion 34 formed at its upper end surface, by which the battery pack 10 can be carried. Like the bottom case 20 and the lower-side battery core pack frame 28, the top case 24 and the upper-side battery core pack frame 32 are also fixed together by bolts etc. (not shown).

The two battery core packs 16a, 16b that constitute the connected body 17 are configured in substantially the same manner. Hence, the corresponding constituent components of the two battery core packs 16a, 16b are labeled using the same reference numerals and will be described in common. Also, the two battery core packs 16a, 16b will be generically referred to as battery core pack 16 when it is not necessary to distinguish them from each other.

As shown in FIGS. 1 to 4, each battery core pack 16 includes a plurality of battery cells 40 (see FIG. 2) and a cell holder 42. In this embodiment, the battery core pack 16 has a cutout portion formed in part of its lower end, in order to form a space 43 (see FIG. 1) for accommodating wiring etc. (not shown) between the battery core packs 16 and the connector unit.

Figure 2:
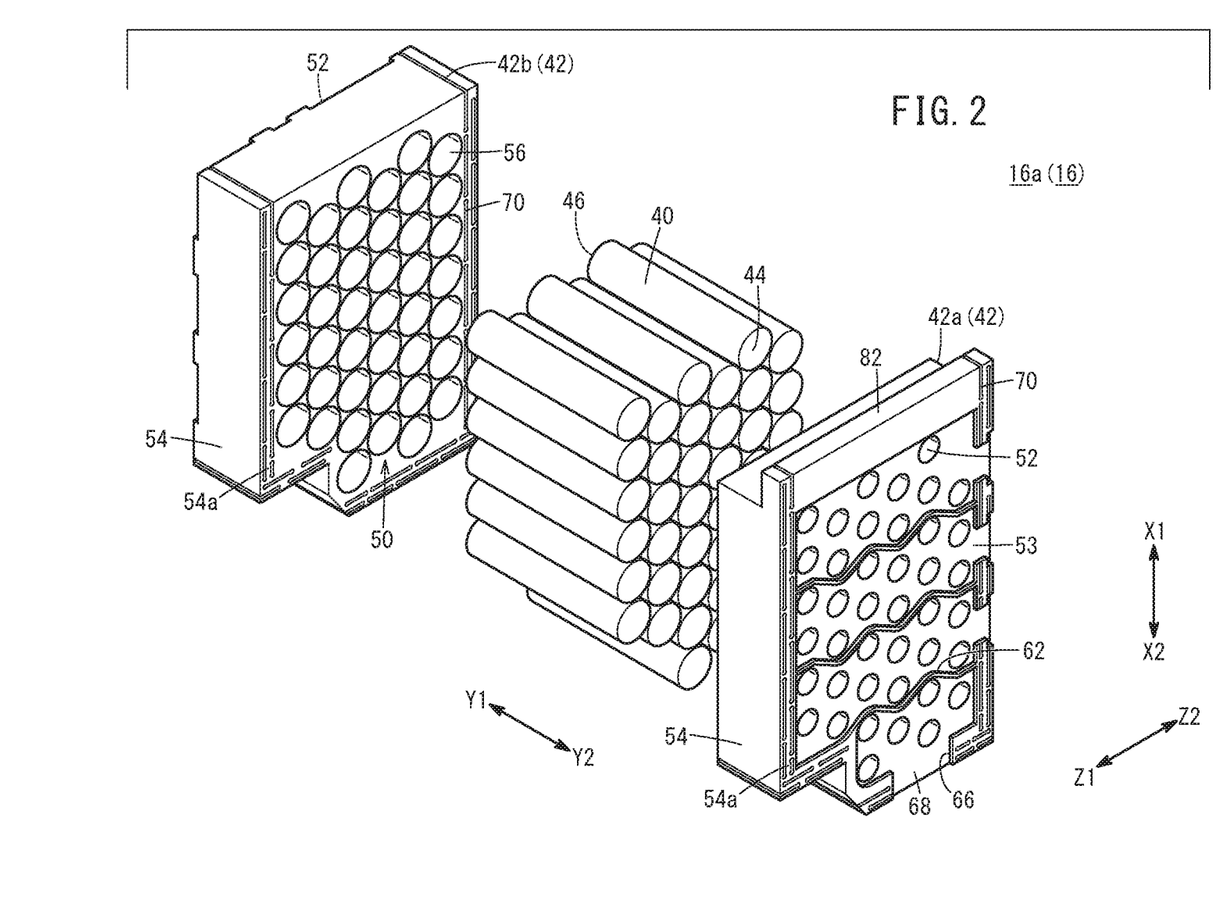
FIG. 2 is an exploded perspective view of a battery core pack.

As shown in FIG. 2, each battery cell 40 has a cylindrical shape, for example, with a positive terminal 44 and a negative terminal 46 provided respectively at both ends thereof in the axial direction. Battery cells 40 of preferred types include lithium-ion secondary batteries, but the battery cells 40 are not particularly limited to this type, and they can be secondary batteries such as nickel-metal hydride batteries, nickel-cadmium batteries, etc., for example.

The cell holder 42 is made of a combination of a positive-side holder 42a and a negative-side holder 42b, each including a holding portion 50 for holding the plurality of battery cells 40, a press plate portion 53 having exposure portions 52 formed therein, and a peripheral wall portion 54 that surrounds the holding portion 50 and the press plate portion 53. The positive terminals 44 are exposed from the exposure portions 52 of the positive-side holder 42a, and the negative terminals 46 are exposed from the exposure portions 52 of the negative-side holder 42b.

In the description below, the cell holder 42 will be explained based on the vertical direction mentioned above (hereinafter also referred to as X direction), the axial direction of the battery cells 40 (the arrow Y1, Y2 directions in FIG. 2, which will hereinafter be referred to also as Y direction), and a direction perpendicular to both the vertical and axial directions (the arrow Z1, Z2 directions in FIG. 2, which will hereinafter be referred to also as Z direction).

The holding portions 50 have a plurality of insertion holes 56 formed therein, so as to hold the battery cells 40 inserted respectively in the insertion holes 56. Each insertion hole 56 extends in the Y direction and exposes the positive terminal 44 and negative terminal 46 of the battery cell 40 respectively from the openings at both ends of the direction in which it extends. Each insertion hole 56 has a diameter corresponding to the outer diameter of the battery cell 40. The plurality of battery cells 40 held in the holding portions 50 are positioned such that their respective positive terminals 44 are flush together and their respective negative terminals 46 are flush together. The gaps between the circumferential surfaces of the plurality of battery cells 40 held in the holding portions 50 may be filled with potting material (not shown), such as insulating resin, etc.

The press plate portions 53 are provided respectively at both ends in the Y direction of the holding portions 50, which have through holes serving as the exposure portions 52 that are formed in positions corresponding to the openings of the insertion holes 56. The positive terminals 44 and the negative terminals 46 (hereinafter also referred to generically as electrode terminals) are exposed out of the cell holder 42 through the openings of the insertion holes 56 and the exposure portions 52. A plurality of busbar plates 60 (see FIG. 1) are attached to the press plate portions 53, so as to cover the exposure portions 52 for exposing the positive terminals 44 and the exposure portions 52 for exposing the negative terminals 46. Each press plate portion 53 has elongated protrusions 62 interposed between the busbar plates 60 to insulate them from each other.

The two battery core packs 16a, 16b are connected to each other to form the connected body 17 in such a manner that the negative terminal 46 side of one battery core pack 16a and the positive terminal 44 side of the other battery core pack 16b face each other.

The positive terminal 44 side of that one battery core pack 16a and the negative terminal 46 side of that other battery core pack 16b, in other words, the side surfaces of the connected body 17 on both sides in the Y direction, face the inner sides of the exterior case 12.

Figure 3:
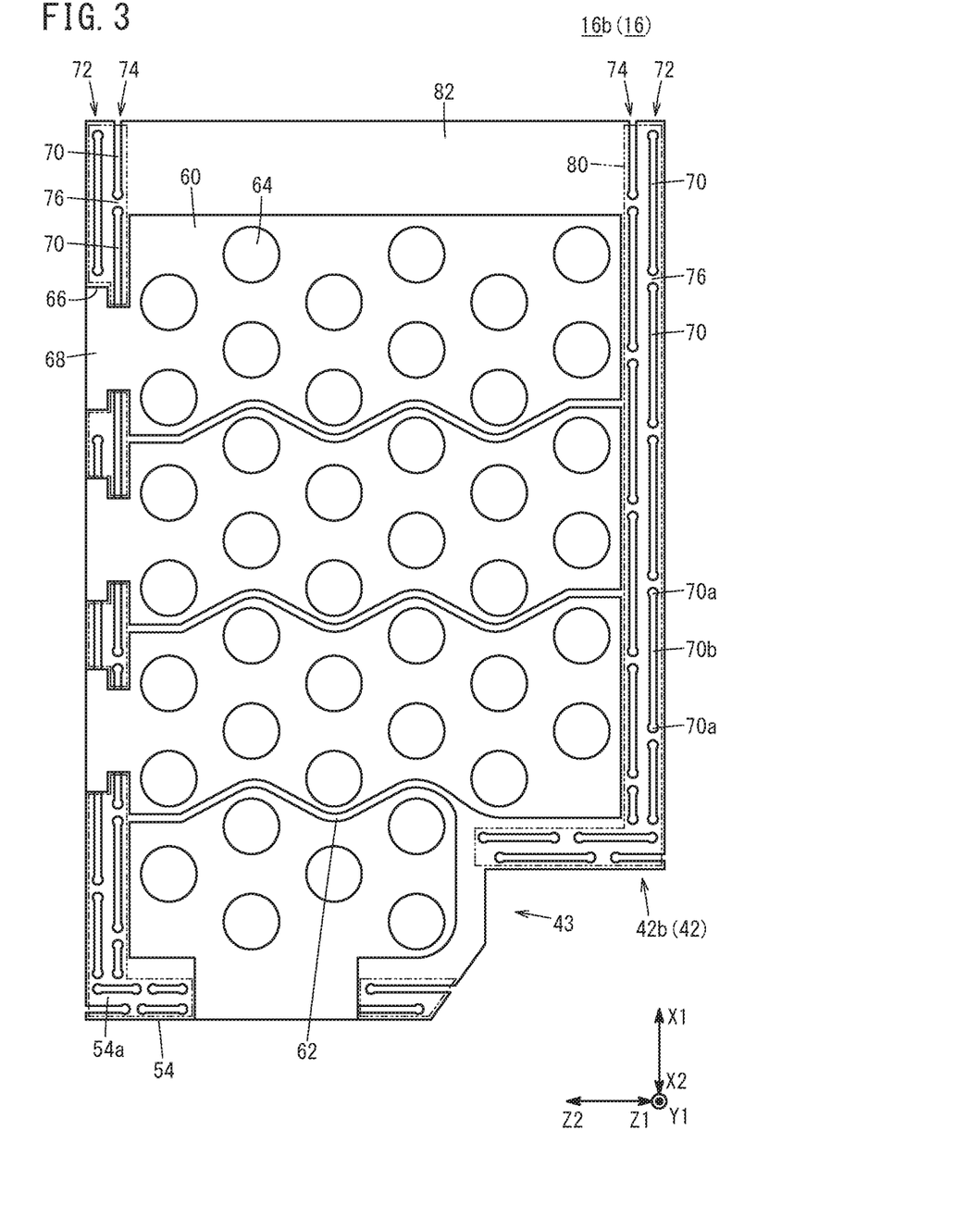
FIG. 3 is a side view of the battery core pack as viewed in the depth direction of slits.

The plurality of busbar plates 60 are each provided to connect a given number of positive terminals 44 or negative terminals 46 in parallel. As shown in FIGS. 1 and 3, each busbar plate 60 has protrusions 64, formed by embossing, for example, that enter the exposure portions 52 so as to be in contact with the electrode terminals. Each busbar plate 60 has a connection end 68 that is inserted into a groove 66 formed in the end surface 54a of the peripheral wall portion 54. The connection ends 68 and the lead wire etc., mentioned earlier, are connected to each other, so that the plurality of busbar plates 60 are connected to the connector unit through the BMU 18, with the busbar plates 60 connected in series.

It is preferable to interpose a heat dissipation sheet (not shown) between the busbar plates 60 and the inner surfaces of the exterior case 12. In this case, the heat generated by the battery cells 40 can be effectively dissipated through the heat dissipation sheet so as to suppress temperature rise of the connected body 17.

Each peripheral wall portion 54 has a plurality of slits 70 formed therein, the slits extending in the end surface 54a of the peripheral wall portion 54 along a peripheral direction thereof. The depth direction of the slits 70 corresponds to the Y direction. As shown in FIG. 3, in this embodiment, as viewed in the depth direction of the slits 70, the slits 70 are formed along sides of the peripheral wall portion 54, except a side that extends in the Z direction at the upper end (on the arrow X1 side) of the peripheral wall portion 54 and a side that faces the space 43 and extends in the X direction. The slits 70 are formed to coaxially penetrate in the Y direction through the peripheral wall portion 54 of the positive-side holder 42a and the peripheral wall portion 54 of the negative-side holder 42b.

Figure 4:
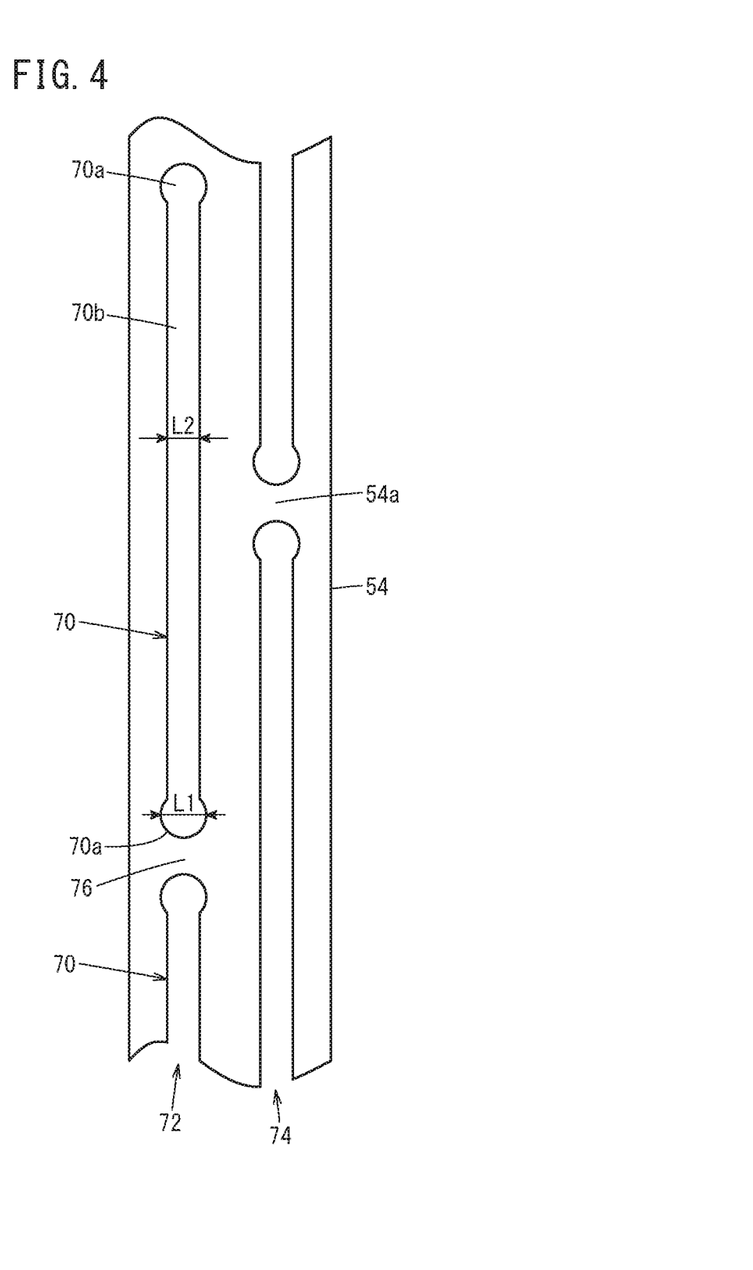
FIG. 4 is an enlarged view showing main part of an end surface of a peripheral wall portion of the cell holder of FIG. 3.

As shown in FIGS. 3 and 4, the slits 70 are arranged to form a plurality of lines 72, 74 that are arranged side by side at an interval therebetween, between the outer peripheral edge and the inner peripheral edge of the end surface 54a of the peripheral wall portion 54. Each of the lines 72, 74 includes a plurality of slits 70 that are arranged along the peripheral directions of the peripheral wall portion 54, with interval portions 76 interposed respectively therebetween. Further, the slits 70 and the interval portions 76 are placed side by side in the directions in which the lines 72 and 74 are arranged side by side. The shape of each slit 70 as viewed in its depth direction includes circular portions 70a provided at both ends of the slit in the direction in which the slit 70 extends, and a linear portion 70b provided between the circular portions 70a. Preferably, as shown in FIG. 4, each circular portion 70a has a diameter L1 larger than a line width L2 of the linear portion 70b.

As shown in FIG. 3, as viewed in the depth direction of the slits 70, it is preferred that the upper end surface (peripheral surface) of the peripheral wall portion 54 is penetrated by slits 70 that extend in the vertical direction. Also, as viewed in the depth direction of the slits 70, the lower ends of the side surfaces (peripheral surfaces) at both ends in the Z direction, and the lower end of the side surface (peripheral surface) of the peripheral wall portion 54 that faces the space 43, are penetrated by slits 70 extending in the X direction. Further, the openings of the slits 70 are covered by films 80. The films 80 are not shown in FIG. 4 and FIG. 6 that will be described later. The material of the films 80 is not particularly limited, as long as it can avoid entry of foreign matter or potting material from the openings of the slits 70.

Protruding walls 82, which protrude upward, are provided on one side in the Y direction (on the arrow Y2 side in FIG. 1), at the upper end of the positive-side holder 42a of the battery core pack 16a, and on the other side in the Y direction (on the arrow Y1 side in FIG. 1), at the upper end of the negative-side holder 42b of the battery core pack 16b, respectively. The upper-side battery core pack frame 32 abuts on the upper end surfaces of the protruding walls 82. This configuration forms a space 84 between the connected body 17 and the upper-side battery core pack frame 32, and the BMU 18 is placed in the space 84 (see FIG. 1).

For example, the BMU 18 includes a control unit configured to control charging and discharging of the connected body 17, a communication unit configured to perform communications with the electric vehicle and charging device, and a storage unit for storing the state of the connected body 17 detected based on temperature, voltage, etc. of the battery cells 40 (none of which are shown).

The battery pack 10 of this embodiment is configured basically as explained so far. With this battery pack 10, the battery pack 10 can be carried to the vicinity of the charging device by being held at the handle portion 34, so as to connect the connector unit and the charging device to charge the battery cells 40, for example. Also, for example, the battery pack 10 can be carried by being held at the handle portion 34 and mounted in the electric vehicle, so as to connect the connector unit and the power supply port to thereby discharge the battery cells 40.

As described above, it is possible to avoid a situation in which the battery cells 40 undergo a load exceeding its load capacity, even if the battery pack 10 falls and is subjected to an impact load during the operation of being attached to or removed from the charging device or electric vehicle. This is because, with this battery pack 10, the peripheral wall portions 54 deform elastically in the direction in which the width of the slits 70 contracts, whereby the cell holder 42 can absorb the impact load to reduce the load transmitted to the battery cells 40. Furthermore, even if an impact load is applied intensively to part of the peripheral wall portion 54, the plurality of slits 70 can disperse and absorb the impact load within the peripheral wall portion 54. Consequently, superior impact resistance is obtained against large impact loads.

As described above, with the battery pack 10 having the slits 70 formed in the peripheral wall portions 54 themselves, it is possible to improve the impact resistance without making the battery pack 10 larger, unlike in the case where, for example, the holding portion 50 and the peripheral wall portion 54 are separated from each other and impact mitigating ribs (not shown) etc. are provided between them. It is also possible to easily improve the impact resistance of battery packs 10 manufactured according to various specifications, by adjusting the extending length, width, depth, number, arrangement, etc. of the slits 70, according to the shape of the case 14, shape and weight of the connected body 17, arrangement of the connected body 17 in the case 14, etc., for example. Furthermore, the impact resistance can be improved by the simple structure where the slits 70 are only formed in the peripheral wall portions 54. Moreover, impact loads can be absorbed repeatedly as long as the peripheral wall portions 54 deform within the elastic limit.

With the battery pack 10, the provision of the films 80 covering the openings of the slits 70 prevents entry of foreign matter or potting material into the slits 70 through the openings of the slits 70. That is, it is possible to prevent a situation where such foreign matter, potting material, etc. hinder the elastic deformation of the peripheral wall portions 54, and this eliminates the possibility of decrease in the impact absorbing capability of the peripheral wall portions 54.

With the battery pack 10, as described above, arranging the slits 70 to form a plurality of lines 72, 74 further facilitates the elastic deformation of the peripheral wall portions 54 subjected to an impact load, thereby improving the impact absorbing capability of the peripheral wall portions 54.

Furthermore, arranging a plurality of slits 70 in each line 72, 74 along the peripheral directions of the peripheral wall portion 54 with the interval portions 76 interposed respectively between the slits facilitates the elastic deformation of the peripheral wall portion 54 subjected to an impact load and also facilitates dispersion and absorption of the impact load within the peripheral wall portion 54. This further improves the impact resistance of the battery pack 10.

Moreover, arranging the slits 70 and interval portions 76 side by side in the directions in which the lines 72, 74 are arranged side by side avoids a situation in which the impact load is transmitted to the battery cells 40 through the interval portions 76. That is, the direction in which the impact load is applied effectively intersects the direction in which the slits 70 extend, so that the peripheral wall portion 54 can easily deform elastically in the direction in which the width of the slits 70 contracts. This favorably improves the impact absorbing capability of the peripheral wall portion 54.

Still further, each slit 70, as viewed in its depth direction, has the circular portions 70a at both ends thereof in the direction in which the slit 70 extends, and it is thus possible to suppress concentration of stress at the both ends of the slit 70 when the peripheral wall portion 54 deforms due to an impact load. As a result, it is possible to improve the durability of the cell holders 42, and thus the durability of the battery pack 10. Also, the side surfaces of the peripheral wall portion 54 are penetrated by slits 70, and this also further facilitates the elastic deformation of the peripheral wall portion 54 subjected to an impact load and thus improves the impact absorbing capability of the peripheral wall portion 54.

The present invention is not particularly limited to the above-described embodiments and various modifications are possible without departing from the essence and gist of the present invention.

Figure 5:
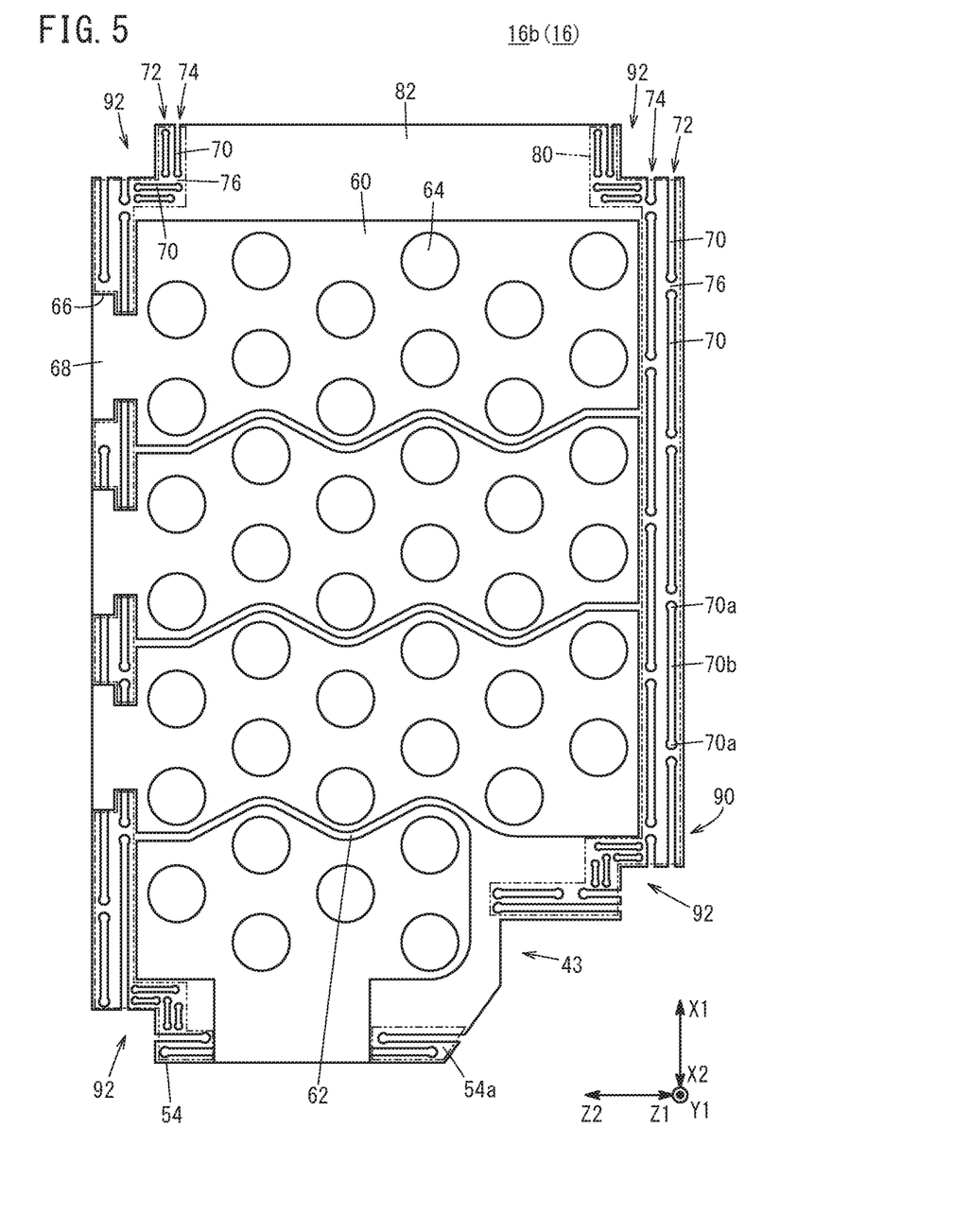
FIG. 5 is a side view of a battery core pack having a cell holder according to a modification, as viewed from the depth direction of slits.
Figure 6:
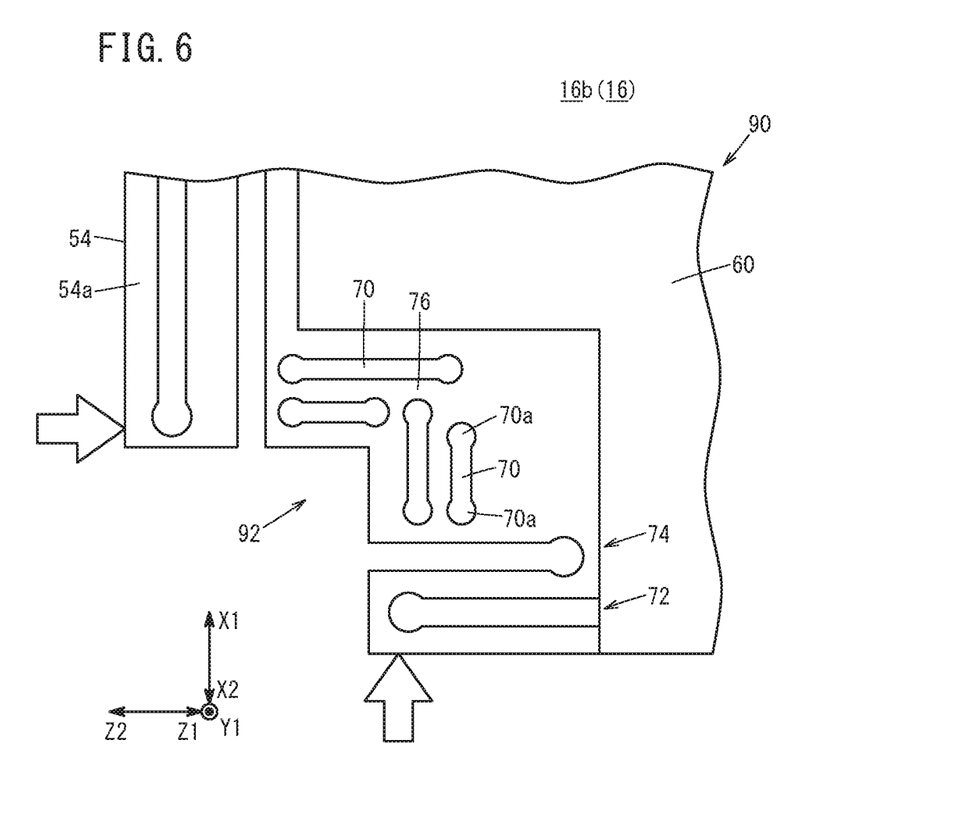
FIG. 6 is an enlarged view showing a recessed portion in the peripheral wall portion of the cell holder of FIG. 5.

For example, the battery pack 10 may include a cell holder 90 shown in FIGS. 5 and 6 in place of the cell holder 42 described above. FIG. 5 shows a battery core pack 16 having the cell holder 90 according to a modification, as viewed from the depth direction of the slits 70, and FIG. 6 is an enlarged view of main part of a recessed portion 92 of a peripheral wall portion 54 of the cell holder 90 of FIG. 5. In FIGS. 5 and 6, the constituent components that provide identical or similar functions and effects to those shown in FIGS. 1 to 4 are labeled using the same reference numerals and will not be described in detail again.

The cell holder 90 is configured in the same manner as the above-described cell holder 42 except that the peripheral wall portion 54 has, formed at corners thereof, recessed portions 92, which are recessed toward the holding portion 50. As shown in FIG. 6, as in the other parts of the peripheral wall portion 54, slits 70 are formed also in the recessed portion 92 along the peripheral directions of the end surface 54a. That is, in the recessed portion 92, the slits 70 are arranged to form a plurality of lines 72, 74 placed side by side at an interval therebetween, between the outer peripheral edge and the inner peripheral edge of the end surface 54a of the peripheral wall portion 54. Further, each line 72, 74 includes a plurality of slits 70 arranged along the peripheral directions of the peripheral wall portion 54, with interval portions 76 interposed respectively between the slits. Further, the slits 70 and the interval portions 76 are arranged side by side in the directions in which the lines 72, 74 are arranged side by side. Furthermore, side surfaces of the peripheral wall portion 54 are penetrated by slits 70.

By the way, when a load is applied to the peripheral wall portion 54 in a direction in which the slits 70 extend, it may be difficult for the peripheral wall portion 54 to deform elastically, as compared to cases where a load is applied from other directions. However, with the cell holder 90 in which the recessed portions 92 are formed in the corners and the slits 70 are formed along the peripheral directions of the recessed portions 92, as shown by arrows in FIG. 6, the direction in which a load is applied and the direction in which slits 70 extend intersect each other even if the load is applied to the battery pack 10 in any direction. As a result, the peripheral wall portion 54 subjected to the impact load can effectively deform elastically, and thus it is possible to improve the impact absorbing capability of the peripheral wall portion 54 and improving the impact resistance of the battery pack 10.

The shape, arrangement, number, etc. of the slits 70 are not limited to those illustrated in the embodiments above, but slits 70 may be formed in any sides of the peripheral wall portion 54, for example. Further, slits 70 may be formed in one line, or in three or more lines. Such shape, arrangement, number, etc. of the slits 70 can be easily adjusted to desired settings during manufacturing of the cell holder 42, 90 by injection molding etc., for example.

The battery pack 10 of the embodiments above includes the connected body 17 in which the two battery core packs 16a, 16b are connected to each other. However, the battery pack 10 may include one battery core pack, or may include a connected body (not shown) in which three or more battery core packs are connected together.

What is claim is:

1. A battery pack including a battery core pack having a plurality of battery cells held in a holding portion of a cell holder, and a case accommodating the battery core pack, wherein
    the cell holder includes a peripheral wall portion that surrounds the holding portion, and
    the peripheral wall portion has a plurality of slits formed therein, the slits extending in an end surface of the peripheral wall portion along a peripheral direction thereof, and the slits being formed to coaxially penetrate the cell holder in parallel with the holding portion.

2. The battery pack according to claim 1, wherein the peripheral wall portion includes, formed at a corner thereof, a recessed portion that is recessed toward the holding portion.

3. The battery pack according to claim 1, further comprising a film configured to cover openings of the slits.

4. The battery pack according to claim 1, wherein the slits are arranged to form a plurality of lines that are arranged side by side at an interval therebetween, between an outer peripheral edge and an inner peripheral edge of the end surface of the peripheral wall portion.

5. The battery pack according to claim 4, wherein each of the lines includes the plurality of slits that are arranged along the peripheral direction, with interval portions interposed respectively therebetween.

6. The battery pack according to claim 5, wherein the slits and the interval portions are arranged side by side in a direction in which the plurality of lines are arranged side by side.

7. The battery pack according to claim 1, wherein
    each of the slits, as viewed in a depth direction thereof, has a shape that has circular portions formed at both ends thereof in a direction in which the slit extends, and a linear portion formed between the circular portions, and
    each of the circular portions has a diameter that is larger than a line width of the linear portion.

* * * * *